United States Patent Office 2,836,553
Patented May 27, 1958

---

2,836,553

IRRADIATED RESINS

Donald A. Guthrie, Cranford, N. J., and David W. Young, Homewood, Ill., assignors to Esso Research and Engineering Company, a corporation of Delaware No Drawing. Application September 27, 1955
Serial No. 537,064

11 Claims. (Cl. 204—158)

This invention relates to the irradiation of resins and more particularly relates to gamma irradiation of sulfonated polystyrene ion exchange resins. Still more particularly, the present invention relates to a method for preparing improved sulfonated polystyrene ion exchange resins by gamma irradiation, to the improved resins so produced and to uses of these improved resins.

The present application is a continuation-in-part of Serial No. 468,991, filed November 15, 1954, by David W. Young, one of the present applicants.

Ion exchange resins are well known in the art. A particularly useful and widely used type of ion exchange resin is a sulfonated polystyrene resin. Such resins have been employed heretofore to advantage in a wide variety of applications such as water softeners, catalysts in hydrocarbon conversion processes and the like. Although these particular ion exchange resins have provided outstanding performance, they have the disadvantage of being relatively unstable to hydrolysis, particularly at elevated temperatures and pressures.

It has now been found that ion exchange resins and more particularly sulfonated polystyrene resins can be substantially improved by exposing or subjecting the resins to high intensity radiation. The irradiated resins are characterized by their substantially increased stability to hydrolysis, which is particularly noticeable at elevated temperatures. In addition it has been found that the improved resins of the present invention are outstanding catalysts for a process wherein olefinic hydrocarbons are hydrated to form oxygenated products comprising alcohols and ethers.

THE SULFONATED POLYSTYRENE RESINS

The present invention is particularly applicable to sulfonated polystyrene resins and especially to sulfonated polystyrene resins which contain as constituent monomers about 50 to 99 weight percent of styrene and about 1 to 50 weight percent of divinyl benzene, preferably 75 to 98% by weight of styrene and 2 to 25 weight percent of divinyl benzene, and especially about 84 to 98 weight percent of styrene and 2 to 16 weight percent of divinyl benzene. Such resins are well known in the art and are marketed commercially and are therefore particularly useful in the present invention. It will be understood, however, that the present invention is also applicable to other ion exchange resins. For example, instead of styrene, it is permissible to use other monovinyl aromatic compounds such as p-methyl styrene, p-ethyl styrene, α-methyl styrene, α-methyl p-methyl styrene or other dimethyl styrenes, p-chlorostyrene, dichlorostyrenes, and so forth. While, in general, compounds having the vinyl group in para position to the alkyl or halogen substituents are preferred, other isomers are similarly useful also. Likewise, instead of using divinyl benzene as the chemical cross-linking agent, other polyvinyl aryl compounds may be used such as divinyl toluene, divinyl xylene, divinyl ethyl benzene, divinyl chlorobenzene, divinyl ethers, divinyl naphthalene, and the like. It will also be understood that the present invention is applicable to such resins containing minor amounts of monomers other than styrene and divinyl benzene (or similar compounds) such as, for example, butadiene, isoprene and isobutylene.

These resins may be prepared in a variety of ways from a variety of raw materials. For instance the sulfonation or equivalent acid treatment may be applied to a monomer such as styrene which is subsequently polymerized into a suitable high molecular weight ion-exchange resin. Preferably, however, the organic resin is formed first and then the acid groups are introduced by treating the solid resin in suitably subdivided or granulated form.

The polymerization of the aforementioned ingredients can be carried out by any of the well-known methods, e. g., by simple heating at an elevated temperature such as 100° C. for a suitable length of time, such as 10 days. However, it is preferable to use a catalytic amount of an oxygen-yielding compound such as benzoyl peroxide, ammonium persulfate, potassium persulfate, sodium perchlorate, sodium perborate, ozone, ozonides, etc., with temperatures of about 20–120° C., and a polymerization time inversely of a week to as short as a few hours. The polymerization can be carried out either in homogeneous phase or in emulsion. For instance, satisfactory materials can be prepared according to the procedure described in Patent No. 2,089,444 or 2,500,149. Depending on the technique employed, the polymeric resin can be produced either in the form of nearly spherical hard granules of a proper size for further use, or the polymeric resin can be produced in the form of larger masses which are reduced to the desired particle size by crushing or cutting.

In making the aforementioned organic materials into the desired cation-exchange resins, they are sulfonated or phosphonated in a manner otherwise well known so as to introduce on the average about 0.25 to 3, preferably about 0.5 to 2, inorganic acid radicals per benzene nucleus of the polymeric resin. Suitable sulfonation agents include concentrated or fuming sulfuric acid, chlorosulfonic acid, sulfur trioxide in nitrobenzene, etc. An excess of the sulfonating agent is used. Depending on the sulfonating agent used, temperature of sulfonation may be in the range of about —20° to 200° C., preferably —20° to +50° C. in the case of chlorosulfonic acid. Higher temperatures are best with sulfuric acid. The resin is preferably in a relatively coarse particle size such as 20–100 mesh so as to be suitable for direct use in the eventual olefin hydration process. Thus, the subdivided copolymer, e. g., one containing 90% of combined styrene and 10% of combined divinyl benzene, can be mixed with an excess of chlorosulfonic acid, e. g. about 6 parts acid per part of copolymer, briefly heated at reflux temperature for about 3 minutes and subsequently the mixture is held at room temperature for about 50 hours. Finally, a large excess of water is added to the mixture, and the latter is then filtered, washed and dried. In a typical operation a yield of about 235% of sulfonated resin (based on copolymer) is thus obtained. This sulfonated resin contains an average of about 1.77 sulfonic acid groups in each of its aromatic nucei. At lower temperatures a less extensively sulfonated product is obtained, e. g., one containing a single sulfonate group per aromatic ring.

To minimize physical disintegration of the hard copolymer during sulfonation, the granules may first be swelled in a suitable solvent such as benzene, toluene, xylene, carbon tetrachloride, trichloroethylene, tetrachloroethylene and the like, in a manner substantially as described in Patent No. 2,500,149. For instance, some granulated copolymers can be swelled by contact with 10 to 50 volume percent of a solvent such as tetrachloroethylene to as much as about 170% of the original copolymer volume. However, in most instances even slight swelling is helpful in reducing subsequent disintegration. After draining off excess solvent, the swollen granules are then treated with one of the sulfonating agents mentioned above, e. g., 98% sulfuric acid.

The sulfonation reaction starts at the surface of each granule and is continued until the entire granule has been penetrated by the acid to give a complete reaction. The strength of the acid decreases as the sulfonation proceeds. After completion of the reaction the remaining acid is washed out with water, or first neutralized and then washed. As water replaces the acid, further swelling of the granules may occur, up to about 25%. Too rapid dilution with water tends to weaken the resin structure and may result in subsequent fracture of the granules. It is, therefore, advisable to replace the residual acid by slow addition of water over a period of as much as 24 hours or more. Either stepwise or continuous water addition is suitable.

The washed sulfonated product is generally saturated with water and is in a swollen state. Thus, commercially available sulfonated resins normally contain from about 40 to 70% water. It is advisable to store such resins in water-tight containers under conditions which will prevent drying out of the resin as undue loss of this water content may lead to disintegration of the granules upon subsequent contact with water. For instance, a resin originally containing 55% moisture may be dried out at 60% relative humidity to a equilibrium moisture content of only about 30%. When such a partially dried out resin is placed in water, water absorption may be so rapid that severe disintegration of the granules takes place.

It will be understood, of course, that the described polystyrene type ion-exchange resins as well as their preparation are well known and readily available as commercial products. For instance, a particularly useful resin for purposes of the present invention is a commercial cation-exchange resin known under the trade name Dowex 50X8 and made by the Dow Chemical Company. This is a sulfonated resinous copolymer of about 92% styrene and 8% divinyl benzene, which contains about 44 to 50% moisture and about 12 to 16% sulfur in the sulfonate form, based on anhydrous resin. This material has approximately the same acidity as benzene sulfonic acid. Useful materials of this type having a somewhat higher divinyl benzene content are also marketed under the names of Dowex 50X12 as well as Dowex 50X16. All of these materials are brown in color. Another material is Dowex 50WX8 which is cream colored and especially stable in the mechanical sense due to virtually complete absence of internal strains as shown by inspection under polarized light. This material is prepared by introducing the sulfonic acid groups into the polymer under special conditions so that oxidation of the polymer is almost completely avoided.

Other sulfonated polystyrene ion-exchange resins are sold by the Rohm and Haas Company under the "amberlite" trademark, particularly "amberlite-IR-120." All of these sulfonic acid type ion-exchange resins are usually sold in the form of sodium salts which can be readily converted or regenerated to the acid type by washing with an aqueous solution of sulfuric or hydrochloric acid in a manner well known by itself. In such regeneration the hydrogen ions of the wash acid replace the sodium ions of the resin. The ion-exchange resins in their free acid form have an acidity of about 2 to 10 milliequivalents per gram, depending on the resin base and extent of sulfonation. The preferred commercial resins usually have an acidity of about 5 milliequivalents per gram.

THE IRRADIATION OF THE RESINS

Radioactive materials providing high energy ionizing radiation are useful in the present invention. The preferred radioactive materials are those emitting gamma rays. Materials emitting only beta rays may be employed but are less effective than materials emitting radiation comprising gamma rays. Also, if desired, neutrons may be employed alone or in combination particularly with gamma rays, the latter being a preferred combination.

One source for radioactive materials is an atomic pile. Large quantities of radioactive by-products or waste materials from these atomic piles are now available. The present invention provides a practical utilization of such by-product or waste materials which at present represent a disposal problem due to their steady accumulation. These fission by-products of atomic piles include radioactive elements with atomic numbers ranging from 30 (zinc) to 63 (europium). These waste materials are formed in the course of converting uranium, plutonium or other fissionable material in atomic reactors.

Also, naturally occurring radioactive materials such as radium or thorium may be employed as the radioactive material in the present invention. In addition, various materials made radioactive by exposure to neutron radiation, such as radioactive cobalt ($Co^{60}$), europium$^{152}$, europium$^{154}$, etc., may also be used for the purposes of the present invention. Also, the fission gamma radiation and the neutron flux existing in an atomic reactor may be employed. This latter method is an especially desirable method when an atomic reactor is readily available.

In addition to utilizing high intensity radiation emitted from radioactive material, other sources of radiation may be employed; for example, the high energy beams emitted by ion accelerators, such as the Van der Graaf generator. Using such generators accelerated beams of electrons, protons, deuterons and the like are produced and these too will serve the purposes of the present invention.

In accordance with the present invention, the sulfonated polystyrene resins are subjected to high intensity ionizing radiation. Generally, radiation dosages amounting to about 0.1 to 500 megaroentgens may be employed. Preferably radiation dosages of about 1 to 50 megaroentgens, and more preferably about 2 to 25 megaroentgens, are employed. It has been found that a radiation dosage of about 5 megaroentgens is particularly useful. Radiation sources of a strength equivalent to about 50 curies to 1,000 kilocuries of cobalt$^{60}$ may be employed to carry out the irradiation of the resins. Radiation intensities in the range of about $10^2$ to $10^8$, preferably about $10^5$ to $10^7$ roentgens per hour are desirable. Preferably irradiation times of about 0.5 to 50 hours will be employed. However, shorter or longer irradiation times may be employed if desired. The time will depend of course upon the strength of the source and the radiation dosage rate. The irradiation may be carried out from about 0° F. up to a temperature slightly below the softening point of the resin. Room temperature is usually preferred however. Higher or lower temperatures may be employed if desired. However, if temperatures above the softening point of the resin are employed, it may be necessary to break the resin mass down into pellet size for use in subsequent processes. Normal atmospheric pressure is usually preferred although, if desired, sub-atmospheric or super-atmospheric pressures may be employed. If desired, the resin may be dispersed in an inert liquid diluent but this is not necessary and generally is not preferred. However, if an atomic reactor is readily available, it may be desired to pass the resin in a slurry form in such an inert liquid diluent through conduits disposed in the atomic reactor.

USES OF THE IRRADIATED RESINS

The use of ion exchange resins as catalysts for hydrocarbon conversion processes has been proposed. Sulfonated polystyrene resins have been found to be particularly effective catalysts for the direct hydration of olefins to produce alcohols and ethers. It has been found that the present irradiated sulfonated polystyrene resins are particularly useful in such a process. More specifically, it has been found that in such a process the irradiated resins are less susceptible to sulfur loss and are, therefore, more effective catalysts.

More specifically, the present invention is particularly applicable to the hydration of normal olefins in the $C_2$ to $C_4$ range. Accordingly, the invention is particularly applicable to the hydration of hydrocarbon fractions which contain substantial amounts of ethylene, propylene, or n-butylenes, or mixtures thereof. A particularly useful hydrocarbon fraction is one containing about 25 to 100% by weight of propylene. The hydrocarbon feed rate or space velocity may be in the range of about 0.5 to 4 volumes of liquid olefin per volume of catalyst per hour. The product of the hydration consists largely of a mixture of the corresponding alcohols and ethers. Thus, isopropyl alcohol and diisopropyl ether are derived by hydration of propylene. The ratio of alcohol to ether in the hydrated product may range from about 95:5 to 20:80, depending on the specific reaction conditions employed. In particular, relatively low olefin feed rates, e. g., those not in excess of about 1.5 volumes per volume of catalyst per hour, favor the formation of ether relative to alcohol, especially at temperatures of about 350° F. or more.

The reaction temperature is usually kept at about 250° to 425° F., preferably at about 315° to 375° F., the optimum depending somewhat on the particular olefin treated and the product desired. For instance, temperatures of at least 330° F. are preferred where high ether yields are wanted, whereas lower temperatures are preferred when alcohol is desired most.

When substantial amounts of isobutylene are present in the feed in admixture with normal olefins, it may be desirable to treat the mixture first at low temperature, e. g., below 250° F., so as to hydrate the isoolefin with a minimum of polymer formation. Under such conditions the normal olefins pass through the reaction zone substantially unconverted, but can then be hydrated in accordance with the present invention in a separate step subsequent to the hydration of the isoolefin. At temperatures above about 450° F., the resins tend to be relatively unstable and have a short catalyst life. Enough pressure is preferably employed to keep the water of hydration at least partly in liquid phase. Accordingly, reaction pressures may range from 600 to 3,000 p. s. i. g., preferably 1,000 to 1,500 p. s. i. g.

The catalyst is normally disposed in the reaction zone in the form of a packed bed of granular particles ranging in size from about 20 to 60 or 100 mesh. The reaction mixture is passed through such a bed either upwardly or downwardly, the latter being preferred in most instances.

Water of hydration is fed to the reaction zone in a ratio of about 0.3 to 3 moles per mole of olefin, depending at least in part on the product distribution desired. For instance, water/olefin mole ratios of at least 2 will favor the formation of alcohol. Conversely, at low feed rates, and temperatures above 330° F. and with water/olefin mole ratios of one or less, a hydrated product containing a very large proportion of ether can be produced.

The hydration product is a valuable additive for gasoline or diesel fuel which, in addition, may contain other conventional materials such as anti-oxidants, solvent oil, rust inhibitors, and so on. The ethers and alcohols are also useful as solvents, chemicals, etc.

The irradiated resins of this invention are also useful in other applications such as, for example, ion-exchange resins for commercial and home water softeners. The irradiated resins are also useful in commercial processes for the separation and purification of many metallic elements such as the rare earths.

The invention will be more fully understood by reference to the following examples. It is pointed out, however, that the examples are given for the purpose of illustration only and are not to be construed as limiting the scope of the present invention in any way.

Example I

The following commercially available sulfonated polystyrene resins were studied for their stability to hydrolysis at elevated temperatures:

TABLE I.—ION EXCHANGE RESINS STUDIED

| Resin acid [1] | Approximate composition, weight, percent [2] | | |
|---|---|---|---|
| | Monomers [3] | | Sulfonate groups |
| | Styrene | Divinyl benzene | |
| Dowex 50-X2 | 98 | 2 | About 40 weight percent based on total dry resin. |
| Dowex 50-X4 | 96 | 4 | |
| Dowex 50-X8 | 92 | 8 | |
| Dowex 50-X8 [4] | 92 | 8 | |
| Dowex 50-X12 | 88 | 12 | |
| Dowex 50-X16 | 84 | 16 | |
| Dowex 50-X24 | 76 | 24 | |
| Amberlite IR-120 [4] | 92 | 8 | |

[1] Trade names.
[2] Dry basis.
[3] Based on copolymer prior to sulfonation.
[4] Sodium salt.

The above commercially available sulfonated polystrene resins are prepared generally by preparing a copolymer of styrene and divinyl benzene, sulfonating the copolymer and then converting the sulfonated copolymer into a sodium salt. It will be noted that two of the resins studied were in the form of the sodium salt, whereas the other resins were converted to contain free acid groups by simply washing the resin several times with dilute hydrochloric acid solution.

Several of the above mentioned resins were subjected to irradiation in the following manner:

Approximately 50 gm. of each of the wet resins were placed in individual 2-ounce bottles which were tightly stoppered. These bottles containing the resin samples were then placed in the center of a cylindrical cobalt[60] gamma ray source at room temperature for varying periods of time. The radiation intensity to which they were exposed was about 220,000 roentgens/hour.

The non-irradiated resins and irradiated resins were then subjected to a hydrolysis test which was carried out in the following manner:

Twenty grams of the resin (calculated on the dry basis) were introduced together with 600 cc. of distilled water into a one-liter bomb. The bomb was then sealed and shaken for 7 days at 356° F. After this time the bomb was cooled, opened, and the resin was removed and analyzed for sulfur to compare with the sulfur content of the resin before hydrolysis.

The results of this hydrolysis test have been found to correlate quite closely with the results obtained when employing such resins as catalysts in the hydration of $C_2$ to $C_4$ normal olefins to prepare ethers and alcohols. More specifically, the loss of sulfonic acid groups in the hydrolysis test (as indicated by the loss of sulfur) is a measure of the loss of activity of the catalyst in the olefin hydration process.

The following results were found in the hydrolysis test:

TABLE II.—STABILITY OF SULFONATED POLYSTYRENE RESINS TO HYDROLYSIS

| Resin Acid | Irradiation dose (MR [1]) | Sulfur loss in hydrolysis test (percent) |
|---|---|---|
| Dowex 50–X2 | None | Water soluble. |
|  | 5 | Do. |
|  | 10 | Do. |
|  | 25 | 7.2. |
| Dowex 50–X4 | None | 30.0. |
|  | 5 | 9.4. |
|  | 10 | 9.0. |
|  | 25 | 6.8. |
| Dowex 50–X8 | None | 27. |
| Dowex 50–X8 [2] | None | 10. |
| Dowex 50–X12 | None | 27. |
| Dowex 50–X24 | None | 25. |
| Amberlite IR–120 [2] | None | 10.0. |
|  | 5 | 5.3. |
|  | 10 | 6.1. |
|  | 25 | 5.0. |

[1] Megaroentgens.
[2] Sodium salt.

It will be noted that the non-irradiated resin acids lost from about 25 to 30% sulfur in the hydrolysis test or became totally water soluble. Water solubility of the resin is, of source, undesirable. The sulfur loss was essentially independent of the amount of divinyl benzene in the sulfonated polystyrene resin, although with more than 4% of divinyl benzene, the resin was at least insoluble in water. On the other hand, it will be noted that a substantial increase in stability to hydrolysis was realized when employing an irradiated resin in accordance with this invention. More specifically, it will be noted that the Dowex 50–X2 resin became insoluble in water and lost only about 7% sulfur in the hydrolysis test after an exposure of 25 megaroentgens. In the case of the Dowex 50–X4 resin, the sulfur loss from hydrolysis was decreased from 30% to about 9% after an exposure of only 5 megaroentgens.

The above results indicate that the sodium salts of the resin acids are more stable than the resin acids themselves, but are still not as stable as the irradiated resin acids. In addition, it will be noted that the irradiation of a resin acid sodium salt (Amberlite IR–120) using 5 megaroentgens increased still further the stability of the resin by decreasing the sulfur loss through hydrolysis from 10% to about 5%.

*Example II*

An irradiated sulfonated polystyrene resin was then employed as a catalyst for the hydration of propylene to form propyl alcohol and propyl ether. The irradiated sulfonated polystyrene resin employed was prepared in the following manner:

Approximately 700 gms. of 100 mesh Dowex 50–X8 ion exchange resin in the acid form (swollen with about 60% water) was placed in a 900 cc. tube which was tightly stoppered. This tube was then placed in the center of a cobalt[60] source at room temperature for a sufficient period of time to receive 5 megaroentgens of gamma radiation (16.7 hours at about 300,000 R./hr.).

The propylene feed stream employed in the hydration process contained about 95% propylene and about 5% saturated hydrocarbons (principally propane).

The hydration process was carried out as follows:

A stainless steel reaction tube was filled with 500 bulk cc. of the wet resin. At a pressure of 1000 p. s. i. and a temperature in the reaction zone of 300° F., the propylene feed was injected above the catalyst along with water in a downflow operation, using a ratio of one mole of propylene/mole of water. The flow rate was one volume of feed/volume of catalyst/hour during this run. After equilibrium conditions had been established the conversion and selectivity of the process were determined. The total reaction time in this experiment was about 2.5 hours.

For comparison purposes a similar resin was employed as a catalyst in the hydration process except that this second resin was not subjected to irradiation.

The following results were found:

TABLE III.—HYDRATION OF PROPYLENE USING DOWEX 50–X8

| Resin irradiation dose (MR) | Percent conversion [1] | Selectivities [2] | |
|---|---|---|---|
| | | Ether | Alcohol |
| 0 | 44.9 | 40.0 | 47.5 |
| 5.0 | 45.1 | 41.0 | 48.0 |

[1] Defined as the percent conversion of propylene in the feed to oxygenated products.
[2] Defined as the percent of the product appearing as either ether or alcohol.

The results set forth above in Table III show that the irradiation of the ion exchange resin improved its activity as a catalyst for the hydration of propylene. More specifically, it will be noted that the use of the irradiated resin gave increased conversion and higher selectivity toward the production of ether and alcohol.

What is claimed is:

1. A method which comprises subjecting a sulfonated polystyrene-divinyl benzene resin to high energy ionizing radiation of an intensity and duration sufficient to insure stability to hydrolysis.

2. A method for improving the stability of a sulfonated polystyrene resin to hydrolysis which comprises subjecting a sulfonated polystyrene resin to high energy ionizing radiation amounting to about 0.1 to 500 megaroentgens, the constituent monomers of said resin being about 50 to 99% by weight of styrene and about 1 to 50% by weight of divinyl benzene, said sulfonated resin containing about 0.25 to 3 sulfonate groups per benzene nucleus.

3. A method for improving the stability of a sulfonated polystyrene resin to hydrolysis which comprises subjecting a sulfonated polystyrene resin to gamma radiation amounting to about 1 to 50 megaroentgens, the constituent monomers of said resin being about 75% to 98% by weight of styrene and about 2 to 25% by weight of divinyl benzene, said sulfonated resin containing about 0.5 to 2 sulfonate groups per benzene nucleus.

4. Method according to claim 3 wherein the irradiation is carried out at about room temperature.

5. Method according to claim 3 wherein the radiation dosage is about 5 megaroentgens.

6. A sulfonated polystyrene-divinyl benzene resin which has been subjected to from 0.1 to 500 megaroentgens of high energy ionizing radiation comprising gamma rays.

7. A sulfonated polystyrene resin having improved stability to hydrolysis prepared by the method defined by claim 2.

8. A sulfonated polystyrene resin having improved stability to hydrolysis prepared by the method defined by claim 3.

9. In a process for converting olefinic hydrocarbons into an oxygenated product by passing a feed mixture of olefinic hydrocarbon feed and water at least partly in liquid phase through a closed conversion zone under hydration conditions at a temperature between about 250° to 425° F. and at a pressure between 1000 and 1500 p. s. i. g. over a catalyst, wherein the mole ratio of water/olefin is between about 0.3 and 3, the improvement which comprises converting said olefinic hydrocarbon feed to an oxygenated product in the presence of an irradiated sulfonated polystyrene resin prepared by the method of claim 1 as a catalyst.

10. In a process for converting a normal olefinic hydrocarbon feed having 2 to 4 carbon atoms per molecule into an oxygenated product by passing a feed mixture of said normal olefinic hydrocarbon feed and water at least partly in liquid phase through a closed conversion zone under hydration conditions at a temperature between about 250° to 425° F. and at a pressure between about 1,000 and 1,500 p. s. i. g. over a catalyst wherein the mole ratio of water/olefin is between about 0.3 and 3, the improvement which comprises converting said normal olefinic hydrocarbon feed to an oxygenated product in the presence of an irradiated sulfonated polystyrene resin prepared by the method of claim 2 as a catalyst.

11. Process according to claim 10 wherein the hydrocarbon feed contains about 25 to 100% by weight of propylene.

References Cited in the file of this patent
UNITED STATES PATENTS
2,477,380    Kreps et al. _____ July 26, 1949
OTHER REFERENCES
"Nature," pp. 76–77, July 11, 1953.